3,371,134
METHOD OF MAKING CERAMIC
ACOUSTICAL PRODUCT
James C. Ollinger, Lancaster County, Pa., assignor to Armstrong Cork Company, Lancaster, Pa., a corporation of Pennsylvania
No Drawing. Continuation-in-part of applications Ser. No. 148,877, Oct. 31, 1961, and Ser. No. 371,832, June 1, 1964. This application June 23, 1965, Ser. No. 466,477
6 Claims. (Cl. 264—56)

ABSTRACT OF THE DISCLOSURE

Water, mineral wool, and Mississippi M and D clay are mixed to form a homogeneous slurry and deposited as a water-laid sheet. Water is removed and the sheet dried and fired at a temperature in the range of 1000° to 1600° F. to form a ceramic bond.

---

This invention relates to a ceramic acoustical board product which is both incombustible and dimensionally stable and which additionally possesses good physical properties and, more specifically, relates to a light-colored ceramic acoustical board product formed from an aqueous slurry consisting essentially of water, an inorganic wool and clay and to a method of making such a product.

This is a continuation-in-part of application Ser. No. 148,877, filed Oct. 31, 1961, and application Ser. No. 371,832, filed June 1, 1964.

Low density acoustical board products have become a major factor in the building trade in recent years, especially where an attractive appearance and exceptional acoustic properties are desired. Most of the products presently on market, however, have drawbacks to a certain extent, some lacking dimensional stability and some, such as products formed from wood fibers, being inherently combustible. Even commercial products presently available which contain mineral fibers also contain, to varying degrees, organic materials such that they are not totally incombustible.

The primary object of this invention is to provide a method of making a low density, dimensionally stable, incombustible acoustical board product which is light in color so that when painted white it is readily acceptable in accordance with present concepts of ceiling design, the board being firmly bonded throughout by means of a ceramic bond.

Other objects and features of novelty of this invention will appear as the description of certain particular embodiments of this invention proceeds.

In order to facilitate an understanding of the invention, the following flow sheet illustrates the process of forming an acoustical board product in accordance with the method of the invention:

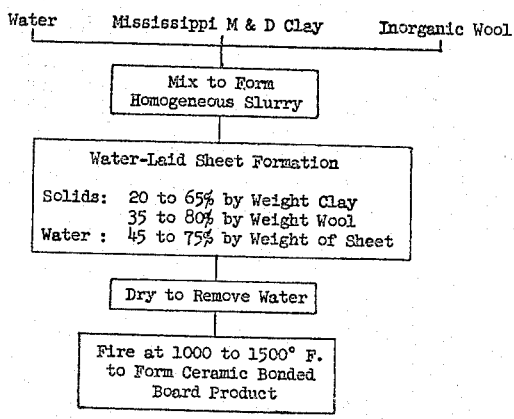

I have discovered that a light-colored ceramic acoustical board product may be formed from a slurry consisting essentially of water, an inorganic wool, and a clay having the clay characteristics of Mississippi M & D clay. The slurry is prepared so that it preferably contains water to the extent of from about 65–99% by weight of the slurry. A water-laid sheet is formed by depositing the slurry on a board-making screen, if necessary draining the sheet thus formed where the sheet has a high water content, to give a board-like product containing from about 45–75% by weight of water, and drying the sheet to remove the remaining water. The light-colored ceramic board product is formed by firing the dried sheet at a temperature in the range of from about 1000–1600° F. Alternatively, the water-laid sheet may be simultaneously dried and fired at a temerature within the preferred firing range resulting in a substantial reduction in the amount of time required for forming the finished ceramic board product. An unexpected advantage in processing is thus achieved over conventional ceramic forming methods insofar as the products of this invention neither explode or crack when all of the water present in the water-laid sheet is removed at the higher firing temperatures.

In producing the board products of this invention, the solids present in the slurry are adjusted so that the water-laid sheet formed therefrom contains, based on the total weight of the solids, from 20–65% by weight of clay and from 35–80% by weight of inorganic wool. Any of the various varieties of inorganic wools may be used in the practice of this invention. Board products having particularly good acoustical and physical properties are formed using iron blast furnace slag wool or phosphate slag wool, although other inorganic wools such as glass wool might be used.

After the water-laid sheet is dried to remove the water present therein, it is fired at a temperature in the range of from about 1000–1600° F. for a length of time sufficient to develop a strong ceramic bond throughout the product or, if desired, the sheet may be simultaneously dried and fired within the preferred temperature range. With a board about 1″ in thickness and at a temperature of about 1300° F., a firing time of about 10 minutes insures the development of a good ceramic bond. At lower temperatures and for thicker boards more time is necessary, a 2″ thick board, for example, requiring a firing time of about 20 minutes at 1300° F. Products formed in accordance with this invention show no loss on ignition, an indication of their ceramic property.

The clay which is preferred in the practice of this invention is a clay known as Mississippi M & D clay. It is a natural ball clay mined in the vicinity of Crenshaw, Mississippi, and is a natural mineral mixture essentially comprised of a mixture of kaolinite and montmorillinite.

To provide further information on the complex characteristics of Mississippi M & D clay, the following analysis of the physical and chemical characteristics are given, by way of example:

Plastic properties:
- Crude color _____ Gray
- Residue 120 mesh, percent _____ Trace
- Type of residue _____ Lignitish
- Water of plasticity, percent _____ 40.0
- Linear dry shrinkage, percent _____ 5.5
- Total linear shrinkage, percent:
  - Cone 5 _____ 15.0
  - Cone 12 _____ 15.5
- Absorption, percent:
  - Cone 5 _____ 0.2
  - Cone 12 _____ 0.0
- Fired color cone 12 _____ Deep ivory
- Modulus of rupture, p.s.i. (50 clay-50 flint, dry):
  - Hand-formed bars _____ Over 1000
  - De-aired, extruded _____ Over 1000

Chemical analysis: Percent
- Silicon dioxide ($SiO_2$) _____ 57.03
- Aluminum oxide ($Al_2O_3$) _____ 27.92
- Iron oxide ($Fe_2O_3$) _____ 2.17
- Titanium dioxide ($TiO_2$) _____ 1.31
- Calcium oxide (CaO) _____ .46
- Magnesium oxide (MgO) _____ .30
- Potassium oxide ($K_2O$) _____ .49
- Sodium oxide ($Na_2O$) _____ .36

Loss on ignition _____ 9.78
P.C.E. _____ 30
pH _____ 7.9

Particle size distribution: Percent
- Finer than 20 microns _____ 99
- Finer than 10 microns _____ 97
- Finer than 8 microns _____ 96
- Finer than 5 microns _____ 95
- Finer than 3 microns _____ 92
- Finer than 2 microns _____ 89
- Finer than 1 micron _____ 83
- Finer than .8 micron _____ 80
- Finer than .5 micron _____ 72

Casting properties:
- Soda ash, percent _____ 0.05
- Sodium silicate, percent _____ 0.72
- Specific gravity _____ 1.76
- Viscosity (200 cc. flow, sec.) _____ 56.8
- Wet weight of cast, gms. (17 min. cast—3 min. drain) _____ 106.0
- Drainage _____ Very good
- Type of cast _____ Plastic-soft
- Water retained, percent _____ 27.9
- Mod. of rupture, p.s.i. _____ 750

It will be obvious to those skilled in the art that other clays and/or clay mixtures having the clay characteristics of Mississippi M & D clay could be used in place of all or part of the Mississippi M & D clay utilized in practicing this invention. Surprisingly, although a fairly large representative number of clays have been investigated, only one other natural clay has been found which apparently has the clay characteristics of the Mississippi M & D clay necessary for the production of acceptable acoustical board products. This may not be as inexplicable as it appears since the clay minerals are of such chemically complex characteristics that it is extremely difficult and often impossible to specifically define all the characteristics of a specific clay. However, we have also found that it is possible to make mixtures of montmorillinite clays and kaolinite clays, the clay characteristics of which approximate the desirable characteristics of Mississippi M & D clay.

In order to develop a light-colored board product using iron blast furnace slag wool, a firing temperature range of about 1000–1400° F. is peferably used, the board becoming black at higher firing temperatures. Using a phosphate slag wool, a firing temperature range of from about 1100–1500° F. is preferably used in order to insure good physical strength in the fired product. Although 10 minutes firing time is considered optimum for forming a strong ceramic bond for a 1″ thick board, this is not necessarily the minimum time and the material may be fired for a longer period, without harm to the product, within the preferred temperature range. Some ceramic bond is obtained in even 1 or 2 minutes of firing, but the longer time is considered essential in forming a strong ceramic bond throughout the board product.

The firing temperatures and times required to form a board having a good ceramic bond are quite surprising in view of teachings in the art of the use of temperatures in the range of 1000° C. to 1500° C. (1832° F. to 2732° F.) to form ceramic products from water-laid felts of inorganic fibers and clays. Thus the products of the invention develop moduli of rupture of 100 p.s.i. or more on firing at 1300° F. for 10 minutes, the board products after firing showing no loss on ignition. When using iron blast furnace slag wool, the board blackens when the temperature is raised to a firing temperature greater than about 1400° F., the board starting to blacken at about 1400° F. In order to produce a light product, it is necessary, if the board is fired at a temperature in excess of about 1400° F., to fire for an additional length of time, which additional firing causes the black color to revert back to a light color. Obviously such treatment is highly uneconomical and the board products fired at such higher temperatures become extremely brittle, the higher temperatures seemingly destroying the fibrous characteristics of the iron blast furnace slag wool. When a phosphate slag wool is utilized in place of the iron blast furnace slag wool, the utilization of firing temperatures above the preferred range or about 1500° F. appreciably affects the physical properties of the board, the strength of the fired product being reduced as the mineral wool loses its fibrous characteristics and the board begins to blacken.

Firing at elevated temperatures, that is at temperatures above the preferred ranges set forth hereinabove, results in board products having a severe disability. When such board products are refired, they show the effect of heat shock and actually the board products which are fired at temperatures in excess of the preferred ranges and then refired at temperatures in excess of 1000° F. spall and crack and cannot even be picked up without falling apart. Such products would have obvious disadvantages when installed for, although being incombustible, they would create a hazard, in the presence of fire, and would fail to act as an effective insulating barrier due to the detrimental effect on the boards by heat shock at temperatures in excess of 1000° F. A further disadvantage attendant in products fired at temperatures in excess of the preferred ranges is less obvious. Thus, it is sometimes desirable to coat the fired product with a white incombustible coat, preferably by firing an inorganic coating composition on the surface of the boards subsequent to the original firing of the board products. Again the resultant heat shock in the refired products (i.e., those which were originally fired at temperatures in excess of the preferred range) causes them to be unsuitable for the purposes intended.

The following examples will serve to more fully illustrate the invention:

*Example 1*

A board-making slurry is made up by mixing, in a planetary mixer, 5.75 pounds of water, 0.7 pound of Mississippi M & D clay, and 1.6 pounds of phosphate slag wool. After the slurry is sufficiently well mixed, approximately 3 minutes mixing in planetary mixer insuring good consistency, a sheet is formed by troweling the slurry without loss of water or clay, the sheet containing 71.5% water and 30% by weight, based on the weight of the total solids, of clay.

The sheet thus formed is dried to remove the water and fired for 10 minutes at 1400° F. to establish a strong ceramic bond. The ceramic board product thus formed is light-colored throughout, has a density ranging from about 2.20 to 2.33 pounds per board foot, good edge strength, and has an average modulus of rupture of 119 pounds per square inch. The noise reduction coefficient of the ceramic acoustical board thus formed is 0.65.

*Example 2*

A slurry was prepared by mixing, in a planetary mixer for 3 minutes, 8.3 pounds of water, 1.2 pounds of Mississippi M & D clay, and 1.6 pounds of mineral wool. A sheet was formed from the slurry thus prepared by depositing the slurry onto a screen and applying vacuum to reduce the water content to 59–62% by weight of the sheet. During drainage, clay is removed with the water but remains in the sheet in the same clay to water ratio as that in the original slurry. The sheet thus formed contained 27–29% by weight of clay based upon the total solids. After drying and firing for 10 minutes at 1300° F., a light-colored board product having a density of 2.25 to 2.39 pounds per board foot and having an average modulus of rupture of 135 pounds per square inch was formed. The ceramic acoustical board product had good edge strength and a noise reduction coefficient of 0.62.

Organic materials which are removed on firing may be added to alter the workability of the slurry or to alter the acoustical properties of the fired sheet. Also, low density fillers such as asbestos fiber or fibrous calcium silicates may be added in minor amounts to the slurry to reduce the density of the board product formed therefrom and in some instances, to improve the strength thereof.

In practicing this invention a clay having the clay properties of Mississippi M & D clay is necessary in order to produce an internally light-colored board having the desired physical properties. When a clay such as bentonite is substituted for the Mississippi M & D clay high shrinkage of the product is realized on drying. Where various kaolins and other types of ball clays are used the resultant product is too weak when fired at the temperature required for producing a light-colored, strong board product. Kaolins and other ball clays give a good board strength with iron blast furnace slag wool at higher temperatures but the resultant board is darkened considerably at such higher temperatures where iron blast furnace slag wool is used or has poor strength where phosphate slag wool is used and, accordingly, such clays are not suitable for use in forming strong boards for white ceilings, the primary use for the acoustical board products of this invention.

An example of a clay which has the clay properties of Mississippi M & D clay is a clay known as M–3KT ball clay which is mined by the Kentucky-Tennessee Clay Co. in the vicinity of Crenshaw, Miss. This clay, in common with the Mississippi M & D clay, has a high plasticity which gives a high green strength, thus the product when dried but unfired has a modulus of rupture of 80 to 100 p.s.i. and greater. The clay has small particle size, also common to Mississippi M & D clay, which allows for good drainage characteristics necessary for forming a water-laid product. It is a good film former on glasslike surfaces such as mineral wool fibers and exhibits low shrinkage on firing, gives good bond strength at the temperature range, and results in a light-colored product when fired within the preferred temperatures ranges, all properties or characteristics also possessed by Mississippi M & D clay. It, too, is essentially comprised of a mixture of montmorillinite and kaolinite.

*Example 3*

A board-making slurry is made up by mixing, in a planetary mixer, 5.75 pounds of water, 0.7 pound of the M–3KT ball clay, and 1.6 pounds of iron blast furnace slag wool. After the slurry is sufficiently well mixed, approximately 3 minutes mixing in the planetary mixer insuring good consistency, a sheet is formed by troweling the slurry without loss of water or clay, the sheet containing 71.5% water and 30% by weight, based upon the weight of the total solids, of clay.

The sheet thus formed is dried to remove the water and fired for 10 minutes at 1300° F. to establish a strong ceramic bond. The board product thus formed is light-colored throughout, has an average density of about 2.2 pounds per board foot, good edge strength, and has an average modulus of rupture of 114 pounds per square inch. The noise reduction coefficient of the ceramic acoustical board product thus formed is greater than 0.50.

When Mississippi M & D clay is substituted for the M–3KT clay in Example 3, the fired board product has a slightly greater average modulus of rupture, about 130, and a noise reduction coefficient greater than about 0.60. The product formed from the M–3KT clay is the lighter in color. Both fired products show substantially no loss on ignition.

A series of various types of clay were also substituted for the M–3KT clay in Example 3. An attempt was made to form board products as set forth in Example 3 keeping all of the conditions constant, including clay to wool to water ratios, method of formation, temperatures and times. In all, a series of 22 clays were investigated in this manner. Only the Mississippi M & D and M–3KT ball clays formed satisfactory board products. Bentonite formed a fairly good board product from a strength standpoint; however, the product showed a 3% shrinkage on firing compared to a shrinkage factor of less than about 0.5% for the board formed from Mississippi M & D clay. Both the Mississippi M & D clay and the M–3KT ball clay containing boards were hard throughout whereas the board formed from the bentonite clay had numerous soft spots where the clay failed to penetrate the wool modules.

Of the 22 clays investigated, the clays being representative of a broad class including six ball clays, six kaolins, bentonite, two plastic fire clays, two aluminum silicates, one hydrous aluminum silicate, one calcite aluminum silicate, two magnesium aluminum silicates, and one hydrated aluminum silicate; none of the remainder gave satisfactory board products, one of the aluminum silicates and one of the kaolins forming boards whose moduli of rupture were not half the moduli of rupture of the board products formed utilizing Mississippi M & D clay and M–3KT ball clay. Of the remaining, only four formed products which could be handled and these four had extremely low moduli of rupture. In all cases in which the modulus of rupture was determined, the boards were sanded to ¾" thickness prior to determining the modulus of rupture and, of the clays tested, 13 formed products which, after firing, were either too soft to pick up or which broke up upon sanding.

Thus, in practicing this invention, a clay having the clay characteristics of Mississippi M & D clay is necessary in order to produce an internally light-colored board having the desired physical properties. As discussed above, when bentonite is substituted for the Mississippi M & D clay, high shrinkage of the product is realized on drying, causing undue warpage in the board product. Various kaolins and other types of ball clays result in products which are too weak when fired at the temperature required for producing a light-colored, strong board product. The kaolins or other ball clays give a good board strength with iron blast furnace slag wool at higher temperatures, but the resultant board is darkened considerably at such higher temperatures and in those instances where phosphate slag wool is used the board products are of poor strength. Accordingly, such clays are not suitable for use in forming strong boards for white ceilings, the primary use for the acoustical board products contemplated by this invention. By mixing bentonite, which is primarily a montmorillinite clay, with various kaolins, one is enabled to form a clay mixture having the combination of desirable properties of both montmorillinite and kaolinite. Although the board strengths are not quite as good as when bentonite alone is used, they are appreciably better than the strengths realized when using the kaolins by themselves. The products do not have the soft spots evidenced in the board products formed from bentonite alone and, depending upon the proportion of kaolin to bentonite, the shrinkage characteristics can be considerably diminished. However, none of the mixtures appears to form board products having as good physical properties as either the board products formed from Mississippi M & D clay or from the M–3KT ball clay.

The following example is illustrative of the formation of a board product which was subjected to a series of controlled firings to illustrate the results obtained in accordance with this invention. In preparing the board, a slurry containing 96.3% water and having a solids consistency of 3.7% and of the following formulation was flowed from a head-box onto a fourdrinier screen to give a water-laid sheet approximately 12' in width.

Solid ingredients: Percent by weight
Papermakers' alum (aluminum sulfate) _____ 0.5
Polyethylene oxide (Polyox WSR–301, Union Carbide) _____ 0.05
Iron blast furnace slag wool _____ 55.0
Mississippi M & D clay _____ 38.8
NaHCO₃ _____ 5.0
Tapioca starch _____ 1.0

The average thickness of the sheet laid up on the fourdrinier screen was 0.740"; this thickness giving, on drying, an average density of 2.18 pounds per board foot and an average dry thickness of .687". Water was drained from the water-laid sheet on formation on the screen and by passing the sheet thus formed over a series of suction boxes and through a roll press where further water pressed from the sheet was removed by vacuum. The sheet thus formed, containing about 55.7% water, was cut into 12' by 12' sections and passed through a drier where heated air at temperatures up to 600° F. was circulated around the sheet to remove the remaining water. The sections were then cut into panels of 4' by 6' dimensions which were face sanded to a final thickness of 0.6". These panels were then kiln fired at the respective temperatures and times set forth in the following table and moduli of rupture were determined for boards of each firing cycle. The average modulus of rupture reported represents four samples at each firing temperature and time with three breaks on each of the four samples, the average reported thus being based on a total of twelve moduli of rupture.

TABLE

| Temperature, ° F. | Time | Average Modulus of Rupture, p.s.i. | Percent Strength Decrease |
| --- | --- | --- | --- |
| 1,400 | 6 min | 247 | (¹) |
| 1,500 | 6 min | 204 | 17.4 |
| 1,600 | 6 min | 192 | 22.3 |
| 1,700 | 6 min | 79 | 68.0 |
| 1,800 | 6 min | 59 | 76.2 |
| 1,800 | 1 hr | 126 | 49.0 |

¹ Standard.

As the temperature was increased the samples became progressively darker in color approaching a charcoal grey color at 1800° F. The samples also became harder, more brittle and friable. Since the mineral wool was obviously melting at 1800° F., several samples were fired at this temperature for one hour and then gradually cooled to room temperature over a period of 16 hours. The strength in the board was improved by the longer firing cycle, probably the result of fusion of the clay particles. A tan-colored brittle ceramic material was formed which had about half the flexural strength as board fired at 1400° F. for six minutes.

The board products of this invention have a density in the range of from about 1.3 to 2.3 pounds per board foot and an average modulus of rupture which may vary from about 110 pounds per square inch to about 200 pounds per square inch or more. Their resistance to humid conditions is excellent and they are both dimensionally stable and sag resistant, thus overcoming a common failure of many of the acoustical board products presently being sold. The noise reduction coefficients are generally excellent and may be varied from about 0.50 to 0.80. The board products of this invention are incombustible.

I claim:

1. A method of forming a light-colored ceramic acoustical board product comprising forming a slurry consisting essentially of water, an inorganic wool, and a clay having the clay characteristics of Mississippi M & D clay, depositing said slurry onto a board-forming screen to form a water-laid sheet having, based on the weight of the total solids, from about 20–65% by weight of clay and from about 35–80% by weight of inorganic wool, drying said sheet to remove the remaining water and firing the dried sheet at a temperature within the range of about 1000–1600° F. to form a ceramic bond throughout the sheet.

2. A method in accordance with claim 1 in which the water in said slurry is present to the extent of from about 65–99% by weight of the slurry and in which the water in said water-laid sheet in present to the extent of from about 45–75% by weight of said sheet.

3. A method of forming a ceramic acoustical board product in accordance with claim 1 in which the clay is Mississippi M & D clay.

4. The method of forming a ceramic acoustical product as defined in claim 3 in which the inorganic wool is iron blast furnace slag wool and in which the firing temperature is in the range of from about 1000–1400° F.

5. The method of forming a ceramic acoustical product as defined in claim 3 in which the inorganic wool is phosphate slag wool and in which the firing tempearture is in the range of from about 1100–1500° F.

6. The method of forming a ceramic acoustical product as defined in claim 3 in which the water-laid sheet is both dried and fired at a temperature within the range of from about 1000–1600° F.

References Cited

UNITED STATES PATENTS 3,014,835   12/1961   Feigley et al.
3,287,476   11/1966   Snyder _____ 106—71 X

OTHER REFERENCES

Ceramic Data Book, 1959, Industrial Publications, Inc., Chicago, Ill., pp. 186 and 187.

ROBERT F. WHITE, *Primary Examiner.*

J. A. FINLAYSON, *Assistant Examiner.*